Sept. 4, 1923.

E. T. CURRAN 1,467,138

AUTO RADIATOR THERMOMETER MOUNTING

Filed May 24, 1921

INVENTOR
Edward T. Curran
BY
Jas H. Griffin
ATTORNEY

Patented Sept. 4, 1923.

1,467,138

UNITED STATES PATENT OFFICE.

EDWARD T. CURRAN, OF DETROIT, MICHIGAN.

AUTO RADIATOR-THERMOMETER MOUNTING.

Application filed May 24, 1921. Serial No. 472,142.

*To all whom it may concern:*

Be it known that I, EDWARD T. CURRAN, a citizen of the United States, residing at Detroit, in the county of Wayne and State of Michigan, have invented a certain new and useful Auto Radiator-Thermometer Mounting, of which the following is a specification.

This invention is an auto radiator thermometer mounting whereby an automobile thermometer may be efficiently and readily mounted on a conventional form of automobile radiator cap, and is particularly intended for employment in conjunction with an automobile thermometer of the character illustrated in my pending application Serial No. 456,916, filed March 30th, 1921, in which application a method is also disclosed enabling correct readings of water temperatures to be made.

The present invention is especially directed to novel and improved means, whereby a thermometer of this character may be associated with the conventional form of radiator cap, in such manner as to enable the method of such application to be practiced therewith.

There are many types of radiator caps on the market and many of these types are provided at their centers with holes for the attachment of an automobile thermometer. As thermometers are now associated with these caps, however, the bulb of the thermometer is subjected, either directly to the action of the steam in the top of the radiator or depends below the surface of the water therein.

The attachment of the present invention is so constituted that when the thermometer is in position on the cap, the bulb thereof will be housed in a closed chamber and will be affected only by heat transmitted from the water to the bulb by virtue of the conductivity of the metal forming the radiator, its cap and parts of the thermometer mounting.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1:
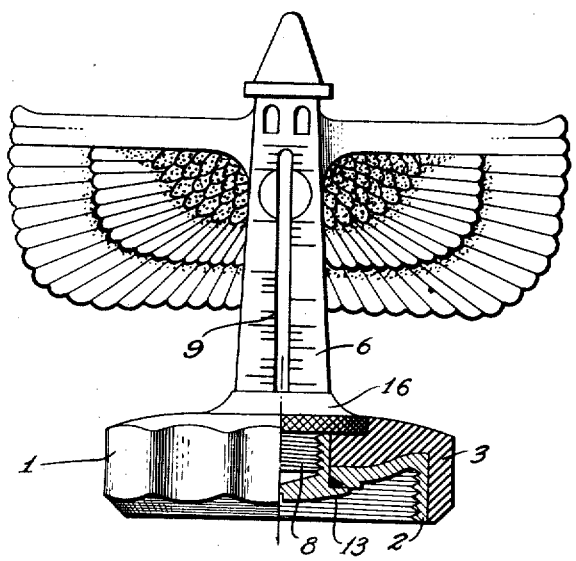
Figure 2:
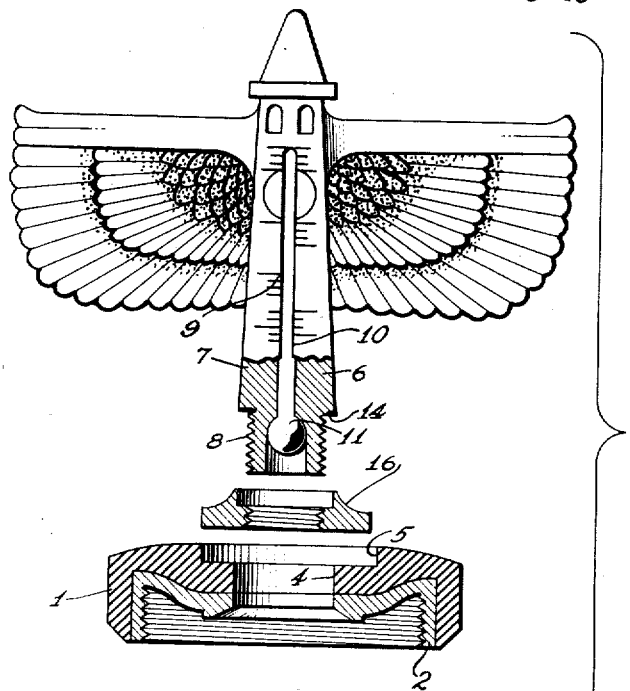

Figure 1 shows a thermometer associated with the radiator cap by means embodying the present invention, a portion of the cap being shown in section in the interest of clearness; and, Figure 2 illustrates in section the various parts entering into the construction, dismantled with respect to one another.

Referring to the drawings, 1 designates any conventional form of radiator cap, but for the purpose of illustration, I have shown a cap well known on the market as the "Black cap," although the invention is capable of being associated with any form of cap and is not restricted to the specific environment in which it is shown in the drawings.

The Black cap, as placed on the market, embodies a metal shell 2, which is provided exteriorly with a covering or coating of insulating material 3, generally bakelite or rubber composition. Certain of these caps are provided with a central hole 4 and a recess 5 to enable a radiator thermometer to be attached thereto, and when so conditioned, are ready to receive the thermometer attaching means of the present invention without further modification. However, any cap which is not provided with a central perforation or depression 5, may be adapted for association with the present invention by perforating it at the center to provide an opening 4. The recess 5 may be formed in such a cap or may be omitted if desired, as it is unessential to the proper performance of the functions of the thermometer or its means of attachment.

For the purpose of illustration, I have shown in the drawings a thermometer 6 of the character described and claimed in my pending application aforesaid, and, as this device is placed on the market, embodies a holder 7 provided with a reduced depending tubular stem 8. The holder has a side opening 9 through which may be seen a tube 10 of the thermometer provided with a bulb 11 housed within the tubular stem 8 of the holder.

In attaching the holder to the cap 1, I utilize an interiorly threaded nut 12 of exterior diameter adapting it to be passed through the hole 5 of the cap in the under side thereof, and of an interior diameter adapted to receive the threaded stem 8 of the holder 7. The interior of the nut is threaded, so that the threaded stem 8 may be screwed thereinto and said nut is provided with an enlarged head 13 adapted to rest against the under side of the cap. In screwing the parts together, for the purpose of tightly clamping the top wall of the cap between the head 13 of the nut 12 and a shoulder 14 formed at the base of the holder 7, the nut 12 may be operated by a screw driver brought into engagement with the slot 15 in the head of the nut, or, if desired, the head 13 of the nut may be made polygonal, so that a wrench may be employed for the tightening of the same.

In practice, I preferably associate a lock nut 16 with the construction, so that the parts may be precluded from working loose when subjected to vibration. I do not limit the invention, however, to the employment of a lock nut 16, as this nut may be omitted without departing from the spirit of this invention.

An important feature of the present invention resides in the fact that when the nut 12 is in position on the parts secured together in the manner described, the lower end of the tubular stem 8 will be closed or sealed.

In the preferred embodiment of the invention shown, this is accomplished by making the threaded hole in the nut "blind," i. e., closed at its lower end. However, in practice, the same result may be accomplished by plugging the lower end of the stem 8, with metal or plastic material, so as to completely enclose the bulb 11 of the thermometer and preclude it from being influenced by vapor or steam within the radiator.

It will be apparent from the foregoing description that the attachment of the present invention is of unusually simple construction, and, with all, highly efficient in the carrying out of its functions. It is inexpensive to manufacture and may be employed by the car owner to associate a thermometer with the cap on the car without the employment of mechanical skill and in a simple and expeditious manner.

The foregoing description sets forth the invention in its preferred form. It will be understood, however, that changes in mechanical details, such as the substitution of equivalents may be made without departing from the spirit of this invention.

Having thus fully described the invention, what I claim as new and desire to secure by Letters Patent is:

1. A thermometer mounting embodying an apertured radiator cap, a thermometer holder carrying a thermometer and provided with a depending threaded tubular stem in which the bulb of the thermometer is housed, and an interiorly threaded blind nut adapted to screw upon the stem of the holder and provided with an enlarged head, whereby the threaded stem of the holder is adapted to be passed through an aperture in the radiator cap, and the nut screwed on to said stem to mount the holder firmly on the cap and simultaneously seal the lower end of the stem of the holder, so that the bulb of the thermometer will not be exposed to vapor within the associated radiator.

2. A thermometer mounting embodying an apertured radiator cap, and a thermometer holder carrying a thermometer and provided with a threaded stem, in combination with an interiorly threaded nut adapted to be passed through an aperture in the radiator cap from the underside thereof and in which nut the threaded stem of the thermometer holder is adapted to be screwed for the purpose of firmly mounting the holder on the cap.

In testimony whereof I have signed the foregoing specification.

EDWARD T. CURRAN.